(12) United States Patent
Isaac et al.

(10) Patent No.: US 7,836,197 B2
(45) Date of Patent: *Nov. 16, 2010

(54) PERSONALIZED ACCOUNT MIGRATION SYSTEM AND METHOD

(75) Inventors: Tomy K. Isaac, Hollis, NY (US); Mark Kasiraja, Weehawken, NJ (US)

(73) Assignee: Esaya.com, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/980,048

(22) Filed: Oct. 30, 2007

(65) Prior Publication Data

US 2008/0065779 A1 Mar. 13, 2008

Related U.S. Application Data

(63) Continuation of application No. 09/723,324, filed on Nov. 27, 2000, now Pat. No. 7,325,067.

(51) Int. Cl.
*G06F 15/16* (2006.01)
(52) U.S. Cl. .............. 709/232; 709/217; 709/219; 709/245; 709/230
(58) Field of Classification Search .............. 709/230, 709/217, 219, 245, 232
See application file for complete search history.

(56) References Cited

U.S. PATENT DOCUMENTS 6,151,608 A * 11/2000 Abrams ............... 707/204

6,581,062 B1 * 6/2003 Draper et al. ............... 707/100

FOREIGN PATENT DOCUMENTS

CA 2295289 A1 * 7/2000

* cited by examiner

*Primary Examiner*—Rupal D Dharia
*Assistant Examiner*—Thomas Duong
(74) *Attorney, Agent, or Firm*—Ward & Olivo

(57) ABSTRACT

A method for migrating information, and a migrator for migrating information, are disclosed. The method may include extracting organizational information from at least two service providers, accessing a first at least one of the at least two service providers upon selection of a migration selection interface by the user, receiving of a first plurality of information related to the user from one of the service providers, accessing a second at least one of the at least two service providers, and writing the first plurality of information to the second at least one of the at least two service providers. The migrator includes an importer in communicative connection with at least one migrate-from service provider, a normalizer that receives a first plurality of information from the importer and converts the first plurality to a standard format, a denormalizer that receives the standard format from the normalizer and converts the standard format to a second plurality of information, and an exporter communicatively connected to a migrate-to service provider, which exporter receives the second plurality of information from the denormalizer and sends the second plurality to the migrate-to service provider.

24 Claims, 4 Drawing Sheets

PERSONALIZED ACCOUNT MIGRATION SYSTEM AND METHOD

CROSS REFERENCE TO RELATED APPLICATIONS

This application is a continuation of U.S. patent application Ser. No. 09/723,324 entitled "Personalized Account Migration System and Method", filed Nov. 27, 2000, now U.S. Pat. No. 7,325,067 which application is hereby incorporated by reference herein as if set forth in the entirety.

STATEMENT REGARDING SPONSORED DEVELOPMENT

Not Applicable.

BACKGROUND OF THE INVENTION

1. Field of the Invention

The present invention is directed generally to transferring personalized accounts from a first service provider to a second service provider, and more particularly to the automated transfer of personalized data information, associated with a first service provider, to a second service provider, such that a user may switch from receiving services from the first service provider to receiving services from the second service provider without being required to manually re-enter the personalizing information with the second service provider.

2. Description of the Background

The use of the Internet as an information tool is commonplace throughout society. The Internet creates accessibility to a large body of information for parties having access to the Internet. Difficulty has arisen in that very numerous formats are in use on the internet to allow for a presentation of this large body of information, and, consequently, it is cumbersome to present information, such as personalized data information, to internet users and internet service providers in a common, efficient manner.

To this end, portal web-sites have been developed to provide Internet users with a predetermined set of links and information displays. These links and displays are were historically common to all users of the portal site, resulting in the provision of information which was of little interest to some users, while not displaying information or links of importance to other users.

In order to improve the efficiency of these portal sites, personalized features were implemented on these sites via the implementation of individualized user profiles. The user profiles define specific interests of the individual user, such as a specific stock that a user desires to track, or the specific profile of a user, such as on email or calendars. The use of active web pages, generated by the information service provider upon an individual's request, allows these pages to be tailored to a multitude of users, without requiring the storage of static information display information.

The ability to personalize pages has not been limited to portal sites, but has also been applied to news, financial, investment and shopping sites as well, for example, particular web-sites may create a customer topic preference list, which is used to present books which are most likely to be of interest to an individual shopper based on the shopper's previous purchases.

The parameters which define an individual's personalizing information are limited by the options implemented by the web-site offering the personalized display. For portal sites, typical parameters include stocks to track, sports teams to follow, a city or location for weather reports, favorite TV channels for programming information, or presentation formats for elements within a display, or, for example, email formatting and handling options, calendar and scheduling preferences, and display preferences, or information generated by a user during use of the portal, such as email, appointments, or telephone calling histories. For example, a book sales web-site might include notations for preferences such as types of fiction read by an individual, musical tastes for record or CD sales, and address and payment information for purchases made by the individual.

The ability to generate personalized web presentations has been based on several technologies for associating personalizing information with an individual user. These technologies include generating scripted web addresses based on an individual's provision of a user access code, such as a user name and a password. The host on which the web site is operating is able to identify the computer originating the request, and graft personalized data information parameters to a base address, forming a scripted address, to which the individual is redirected. The host computer interprets the scripted address as a request for display of the base web page modified pursuant to the grafted parameters. In order for the host computer to be able to understand the grafted material, the material must be appended according to a specific protocol, such that the host can determine what is intended by comparing values at locations with the protocol definitions of those locations. The grafted information may then be used for generating the display associated with the base address.

Storage of the personalized data information for an individual can be accomplished either on the individual's computer, or within a database stored on the web-site's host computer. One tool frequently in use is the storage of a "cookie" on an individual's computer. The cookie contains information, such as when the computer being used by the individual was last used to access the web-site associated with the cookie. Cookies can also be used to hold identifiers associated with the user, or for holding personalizing information for the generation of personalized web displays. Alternatively, where more robust or sensitive information is required, personalized information regarding the individual user and his or her preferences can be stored within a database on the web-site host, where the individual directs the web-site host to recall this information by providing an access instruction, such as submission of a user ID and a password.

Each web-site generally develops its own protocol for storing and implementing personalized data information associated with an individual, due to the fact that each web site may present different options for its users than other web sites. The options become more diverse when preferences are used for specific portal types, such as financial account access portals, club membership portals, or web-store portals. As the internet has evolved, users have been provided with the opportunity to obtain information, to communicate, and to access these services that enable users to manage their personal information and data.

The business success of these portals is dependant on the ability of the site to generate a high hit rate, or number of accesses, by individual users. The more hits, the more an advertiser will pay to have their advertisements shown on the web-site. The primary source for new membership for the portals historically has been first time and beginning Internet users. However, as the Internet has been moving toward saturation, the number of new users dwindles. Thus, as the availability of new Internet users decreases, the ability of a web-service to grow will be dependent on the ability of the web-site to attract customers away from other web-services.

Consequently, competition for users in every portal type and category will necessarily increase as "new" users decrease. Once saturation occurs and the new users are exhausted, new and established providers in every category will need to capture established providers' users. However, capturing established users is difficult, because users are less likely to switch service providers due to the extensive setup process with each service provider, and the consequential need to re-enter the same information twice or more.

Therefore, the need exists for a migration method and system for migrating between service providers that uses known methods of data entry and storage for personalized web sites, but that additionally allows for migration by a user to a new service without re-entry by the user of all previously required information for the old service provider.

SUMMARY OF THE INVENTION

The present invention is directed to a method for migrating information. The method may include extracting organizational information from at least two service providers to form at least two organizational information protocols, wherein one organizational information protocol corresponds to each of the at least two service providers, providing a migration selection interface to a user, accessing a first at least one of the at least two service providers upon selection of the migration selection interface by the user, receiving, according to the organizational information protocol correspondent to the first at least one of the at least two service providers, of a first plurality of information related to the user, upon accessing the first at least one of the at least two service providers, accessing a second at least one of the at least two service providers upon selection of the migration selection interface by the user, and writing the first plurality of information to the second at least one of the at least two service providers according to the organizational information protocol correspondent to the second at least one of the at least two service providers.

The present invention is also directed to a migrator for migrating personalized services. The migrator includes an importer in communicative connection with at least one migrate-from service provider, which at least one migrate-from service provider has been selected by a user, a normalizer that receives a first plurality of information from the importer and converts the first plurality to a standard format, a denormalizer that receives the standard format from the normalizer and converts the standard format to a second plurality of information, and an exporter communicatively connected to a migrate-to service provider, which exporter receives the second plurality of information from the denormalizer and sends the second plurality to the migrate-to service provider. The migrator may additionally include an extractor that extract organizational information protocol from at least two service providers, in order to allow data migration between the at least two service providers.

The present invention solves problems experienced in the prior art because it provides a migration method and system for migrating between service providers that uses known methods of data entry and storage for personalized web sites, and that additionally allows for migration by a user to a new service without re-entry by the user of all previously required information for the old service provider.

BRIEF DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical network communication system. Those of ordinary skill in the art will recognize that other elements are desirable and/or required in order to implement the present invention. However, because such elements are well known in the art, and because they do not facilitate a better understanding of the present invention, a discussion of such elements is not provided herein. Additionally, the following definitions are provided to aid in understanding the usage of terms employed in this specification:

Personalized Data Information—the terms "personalized data information", "personal information", and "preferences" are used to refer to any information used to provide personalized services to an entity, such as an individual or business, including any data entered to a service by an entity during use of the service by that entity. Illustrative personalizing information includes, but is not limited to, a geographic location for preferred weather reports, a specific sports team for preferred sports news, taxpayer information for investment activities, email display and handling preferences, emails sent and received, calendar display and handling, appointments made, contact phone numbers and addresses, banking and loan information and handling, in general personalized preferences, in general formatting preferences, and access and security codes.

Figure 1:
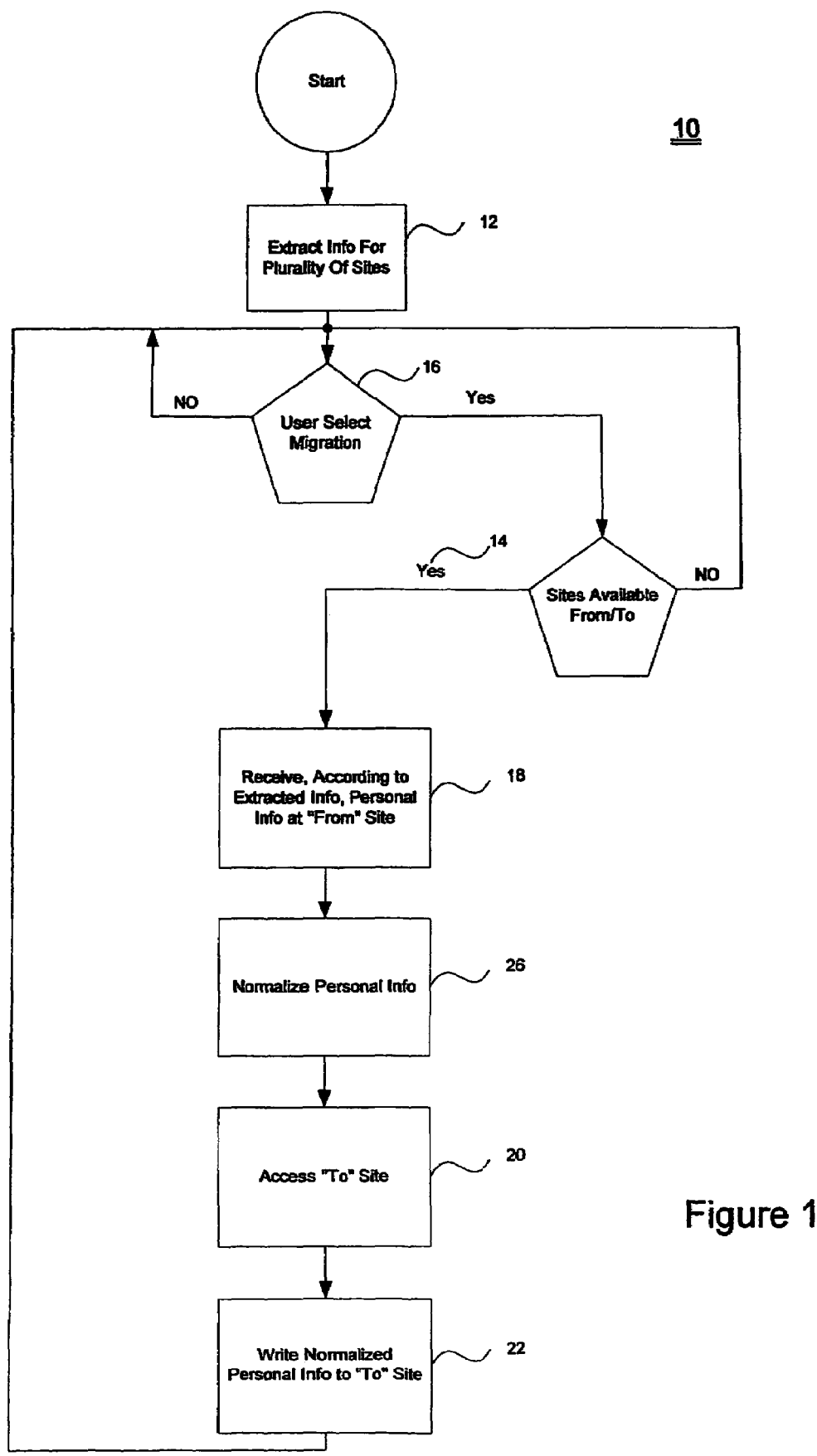
FIG. 1 is a flow diagram illustrating a method for migrating information.

FIG. 1 is a flow diagram illustrating a method 10 for migrating information. The method may include the steps of extracting organizational information from at least two service providers to form at least two organizational information protocols 12, accessing a first at least one of the at least two service providers 14 upon selection of a migration selection interface by the user 16, receiving 18, according to the informational protocol correspondent to the first at least one of the at least two service providers, of a first plurality of information related to the user, accessing 20 a second at least one of the at least two service providers upon selection of the migration selection interface by the user, and the writing 22 of the first plurality of information to the second at least one of the at least two service providers according to the organizational information protocol. These steps are performed by or through a migration provider.

The step 12 of extracting organizational information from at least two service providers forms at least two organizational information protocols. One organizational information protocol is correspondent to each of the at least two service providers from which the extraction occurs. The at least two service providers preferably provide services in any service provision area. For example, service provision areas may include banking and financial services, email services, on line calendar and address book services, "mysite.com" pages, bill payment services, and application service providers, etc.

Banking and financial services may include, for example, services such as the payment of an application for mortgages, loans, balance transfers, and additional transactions involving institutional involvement, including the filling out of forms, credit checks, etc., and may additionally include formatting and digital signal encryption, login and password information. Banking and financial service sites may necessarily include, for example, organizational information such as the location of account numbers and balances.

"Mysite.com" sites provide services such as personalized web pages. For example, a "mysite.com" site may include an ISP site, a wireless customization site, or a shopping site. A "mysite.com" site might include personalized services such as weather, bookmarks, stock quotes, emails and email preferences, or calendars, including all information therein and the setup thereof, for a particular user. A "mysite.com" site may also include online trading sites, such as stock trading, barter, or auction sites. Online trading sites typically require numerous forms to be filled out by a user, and each form, including the set up of each form, would be included in the personal data information received by the migration provider, as discussed hereinbelow.

The organizational information protocol extracted during the extracting step 12 would include the organizational setup of all information types discussed hereinabove, and all others apparent to those skilled in the art, such as its format and location. Thus, the organizational information protocol of a "mysite.com" site may additionally include formatting and digital signal encryption types, and login and password formatting and location information, for the personalized site, for example.

A wireless customization site preferably would include personal data on the wireless telephone user, and may include billing information. Further, a wireless customization site might include calling patterns and plans of the user, and types of telephone used by the user. Wireless customization sites may additionally include, for example, weather, news, and stock quotes, which may then be available using a web-enabled telephone.

Bill payment information may include addresses and amount for each or several creditors, and may include usage patterns for, for example, utility providers. The setup and formatting of both the billing to the user, and of the payment from the user to the creditor, which might include, for example, electronic transfer formatting and location, would form part of the organizational information protocol.

Application service providers include those businesses that allow outsourcing online. For example, an application service provider can automate the payroll for a company on the internet. The organizational information protocol in this example would thus include the location and formatting of the various pieces of payroll information, such as a chart encompassing the order of certain columns pertaining to "employee", "salary", "job title", etc.

The organizational information protocol extracted from the at least two service providers at step 12 is a master setup, extracted in order to provide a framework into which personal information can be sent and received. Upon extraction at step 12, the organizational information may be placed, for example, into an organizational information protocol database organized by service provider as part of step 12. The organizational information may be imported by an importer during the extraction step 12, and the information imported reflects the manner of organization, information entry methods, and information extraction methods, of a service provider site. For example, the organizational information protocol would include the keys, such as html keys, that precede particular pieces of information on a service provider site (i.e. the key "name" precedes the user's name). This keyed information reflects the manner of organization of the information on the service provider Further, organizational information protocol would include the numerical format, or ranges, in which items must be placed for a given service provider.

Further, as discussed hereinabove, the organizational information might include the manner of entry of information to the site. For example, a script can be generated by the method of migrating during the extraction step, which script can be used later for a normalization step, and which script reflects the entry keys that precede or occur with the entry of information. For example, a cookie or other type of identifying information may be used during entry of information by a user, and this information would be extracted as part of the organizational information protocol for each service provider.

Additionally, information extraction methods may be received by the migration provider during the extraction step 12. For example, on a certain service provider, user information may be placed behind a password, and, upon entry of that password, a user may be able to use the keys mentioned hereinabove to locate and extract certain information about the user and the site. That methodology necessary for extracting information is part of the organizational information protocol for each service provider.

The organizational information provides a normalization engine for the information gained in later transactions. Once the organizational information protocol has been extracted, it can be used to extract any personal data information from a site for which the organizational information protocol is known, and that personal information can be normalized, shown as step 26, as discussed hereinbelow. The extraction at step 12 therefore extracts the keys that will be later used to remove key and value pair information containing the personal data information of the requesting user.

The creation of the organizational information protocol database during the extraction step 12 may be performed by numerous different methods. For example, an account or accounts may be created with the service provider by the extracting party, and information may thereby be gained through a tracking and accounting of the account created. Alternatively, a site may be entered onto by the extracting party, and the site may be scraped for the required information. Alternatively, a spider may be created that enters service provider websites and removes the organizational information therefrom. Additionally, each service provider may provide the organizational information protocol to the extracting party.

In a preferred embodiment of the present invention, the extraction at step 12 of the setup and structure information of a service provider site, i.e. the organizational information protocol, from each provider, may be performed, in the first part, by entering the website acting as a browser. For example, a log-in may be generated to enter the first page, cookies returned from the service provider may then be captured, and data required for site entry may then be input, either manually or automatically. Html parsing may then be performed within step 12 to recognize what is displayed on the screen upon entering the site. The screen, and/or the code that makes up the screen, may additionally be scraped to gain organizational information protocol. In certain embodiments of the present invention, security checks of the mysite.com or others service providers may have to be satisfied before the information can be scraped. Once security has been satisfied, the protocol set forth hereinabove is followed and the scraped organizational information protocol may be preferably mapped to a standard format, such as xml, as part of step 12, for normalization into the same format as the subsequently extracted personalized data information. This normalized format database of organizational information protocols, which is preferably an xml format, provides a universal database of organizational information protocols for all service providers available. Further, this universal database may include the manner in which information accessed according to the organizational information protocol must be normalized.

The user is provided with a migration selection interface in order to perform step 16. This migration selection interface may take any form known in the art, such as, for example, clickable icon, button, or tile, the checking of an authorization box, the entry of a name, the entry of a password, the entry of personal information, or the entry of credit card information. Upon selection of the migration selection interface by the user 16, one of the service providers, as selected by the user as the "migration-from" service provider, is accessed, at step 14, if that "migration-from" service provider is available as an extracted-from site in step 12. In a preferred embodiment, this accessing 14 of the migrating-from service provider is performed in a manner such as would be performed by the user himself. For example, upon selection of the migration selection interface, the user may be asked, at step 16, to enter any personal information required to enter the migrating-from service provider site, such as a user name and password, which will be later used by the migration provider to access the migrate-from site.

The step 18 of receiving the first plurality of personal information related to the user who has activated the migration selection interface is performed according to the organizational information protocol that corresponds to the migrate-from service provider, as extracted at step 12. The step 18 of receiving the first plurality of information is performed upon the accessing 14 of the selected migrate-from service provider. The step 14 of receiving the first plurality of information may include, or be separate from, the normalization 26 of the first plurality of information into the same normalized format as the organizational information protocol database, such as xml for example. This normalization 26 is performed by receiving personal information data according to the organizational information protocol for the migrate-from service provider, and placing the received personal information data into a normalized, i.e. universal, format. Thus, the normalization technique will be related to the specific migrate-from provider selected at step 16, and will be performed according to the specific organizational information protocol of the migrate-from service provider, as stored in the organizational information database at step 12.

Figure 2:
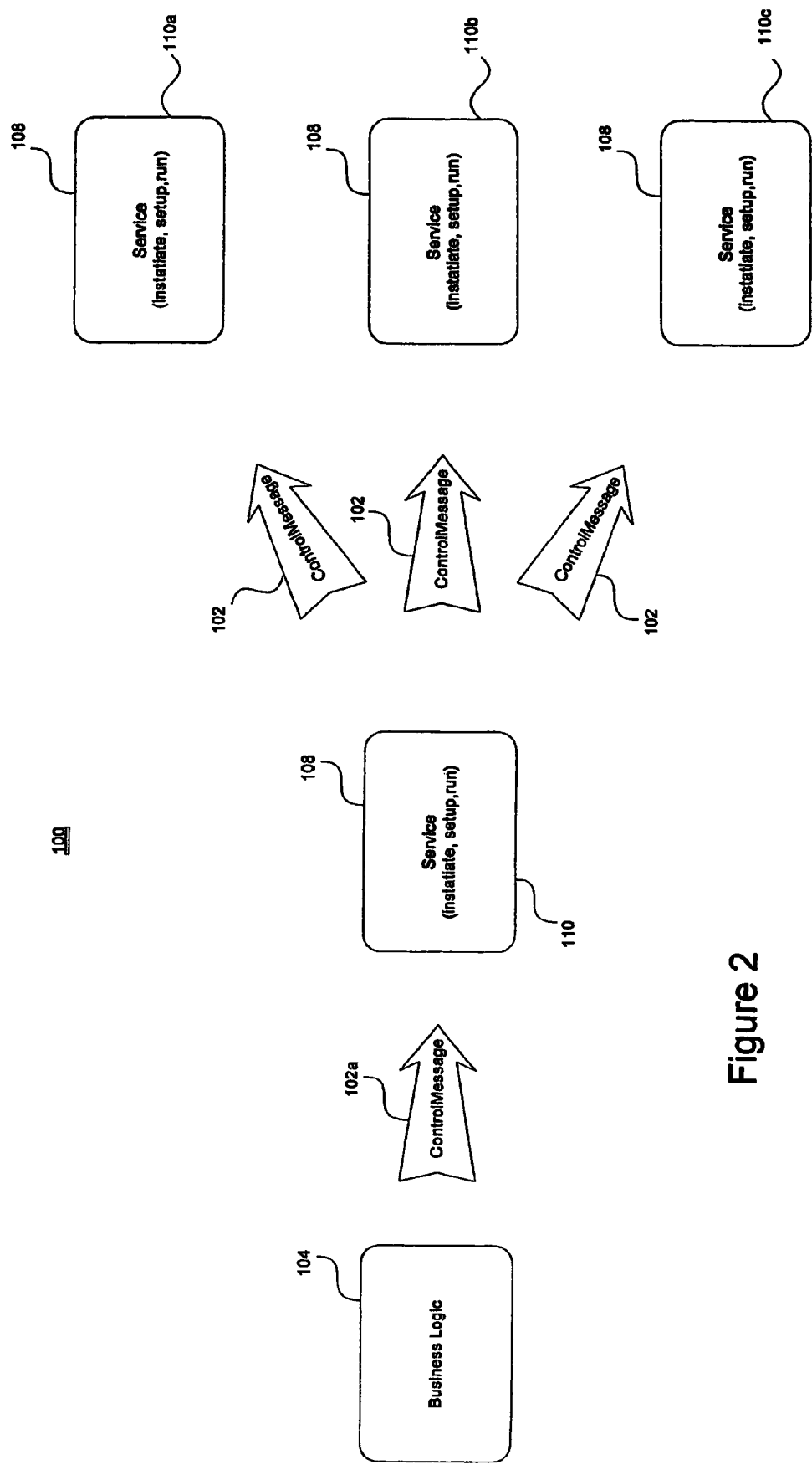
FIG. 2 is a flow diagram illustrating normalization performed by an import coordinating service.

The normalization 26 of the present invention, in an embodiment including normalization 26, is preferably performed by an import coordinating service, as illustrated in FIG. 2. The import coordinating service 104 sends out control messages 102, which control messages 102 request to receive the personal information according to the format stored in the organizational information protocol database. Thus, the control messages 102 are created using the organizational information protocol correspondent to the migrate-from service provider by the business logic 104, and are specifically created to obtain necessary personal data information from the migrate-from provider according to the organizational information protocol of that migrate-from service provider.

Different portions or services of the migrate-from service provider may necessitate different control messages 102, and these control messages 102 may be sent individually, or in a bundle 102a that is divided upon reaching the migrate-from provider 108. Where the control messages 102a are bundled, the main bundled message may be an import coordinating control message 102a that tracks the progress of the individual control messages 102 in the bundle 102a, as shown in FIG. 2, and the individual messages 102 in the bundle 102a may then be used to gain individual pieces of personal data information and report back to the import coordinating control message 102a, which import coordinating control message 102a reports back to the import coordinating service 104. For example, a particular migrate-from service provider may have a mail service 110 that requires three control messages 102 to receive the number and content of messages present 110a, the format in which the messages are displayed 110b, and the unique sending and receiving options of the selecting user 110c, respectively. Thus, the required three messages 102 might be bundled 102a and sent in one import coordinating control message 102a to the mail portion 110 of the migrate-from provider, or may be organized in a master import control message 102a and slave import control message 102 format bundle.

Figure 3:
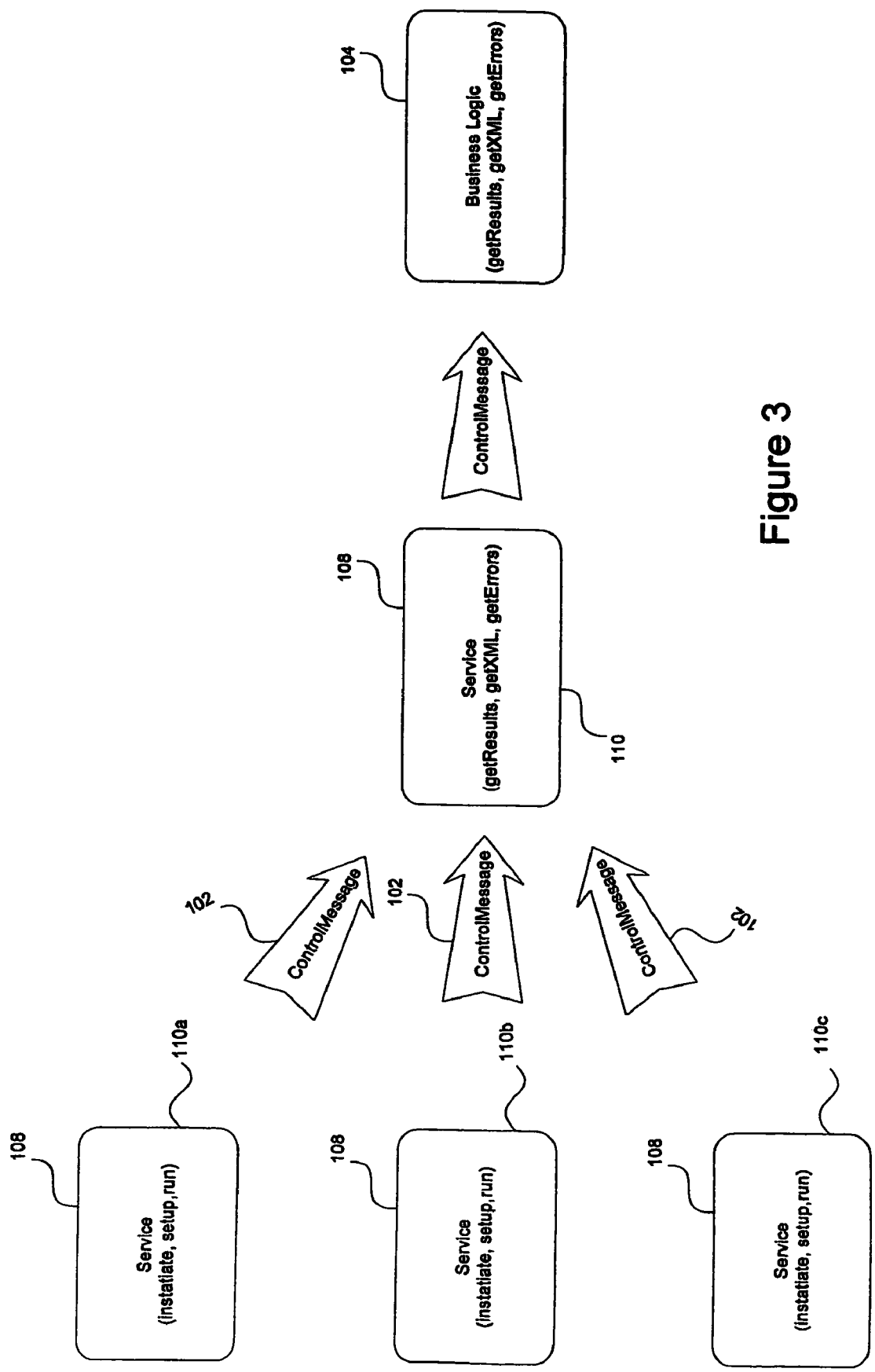
FIG. 3 is a flow diagram illustrating denormalization performed by an export coordinating service.

Information, in the form of return control messages 202, is returned from the individual services 110a, 110b, 110c or service portions that received the control messages 102a, 102b, 102c respectively, and these return control messages 202 are passed through the import coordinating service 104, as illustrated in FIG. 3. The return control messages 202 preferably include the results from the information requested by the control messages, i.e. the personal information data, as well as any errors that occurred in the information requested. For example, if information requested by a control message 202 could not be located, or was not formatted according to the organizational information protocol correspondent to the migrate-from service provider, that error would be returned in a return control message 202. The errors may be forwarded to the requesting user, such as by appearing on the user's computer, or by being emailed to the user, thereby giving the user the option to enter or correct any missing or incorrect information.

Returning now to FIG. 1, a migrate-to service provider is accessed, at step 20, upon selection 16 of a migration-selection interface by the user, and preferably is accessed 20 upon receipt of the first plurality of information from the migrate-from accessed service provider, at step 18. The personal information data, which, in the preferred embodiment, has been normalized 26 by the import coordinator 104, is written 22 to the migrate-to service provider when the migrate-to service provider is accessed 20. The step 22 of writing the personal information data to the migrate-to service provider may include the step of denormalizing the personal data information into the organizational information protocol correspondent to the migrate-to service provider. This denormalization may include the reformatting of the personal data information from the universal format, such as xml, into the format used by the migrate-to service provider, thereby forming a second plurality of information. This denormalization may be performed by an export coordinating service.

The export coordinating service performs the inverse function of the import coordinating service 104, and thus would be shown as FIG. 3, followed by FIG. 2, in order of operation. The export coordinating service preferably removes the normalized personal data information from the normalized database, and either writes the personal data information directly to the migrate-to service provider in the normalized format or a denormalized format, or sends the personal data information via a series of export control messages. These export control messages may be sent individually or in an export bundle controlled by an export coordinating control message, and each message preferably goes to one portion or one service provided by the migrate-to service provider. The message then remaps the personal data information into the proper location on the migrate-to service provider, according to the proper location for the migrate-to service provider as stored in the organizational information protocol database.

The migration provider may use two financial models in conjunction with the present invention. In the first financial model, a casual browser enters the site of the migration provider, and selects the migration selection interface thereon. The casual browser may then be charged a fee for migration, such as to a credit card, or may be migrated for no charge. In this first models service providers may pay a fee to the migration provider to allow new users to use the service. In a second financial model, the service provider may pay a fee in order to provide a link to the migration provider on the service provider's site, thereby allowing the migration provider to offer the service for free to the browser. In this second financial model, service providers preferably pay a fee, such as a promotional fee, directly to the migration provider. In this second model, a service provider may be charged per user migrated-to that service provider, or may pay a flat fee for the use of the migration service. Additionally, the migration method may be sold to the service provider, thus making the migrate-to service provider the migration provider as well. Alternatively, the selection of a migration selection interface, such as a link, on the service provider site may cause the user to be linked to the separate migration provider by a hidden link, thereby appearing to the user to be both the service provider and the migration provider, while, in reality, the two entities remain separate. Thus, as service provision markets become saturated, the present invention opens a new market wherein customers can move readily to new service providers, thereby allowing service providers to gain new customers even in a saturated market.

Figure 4:
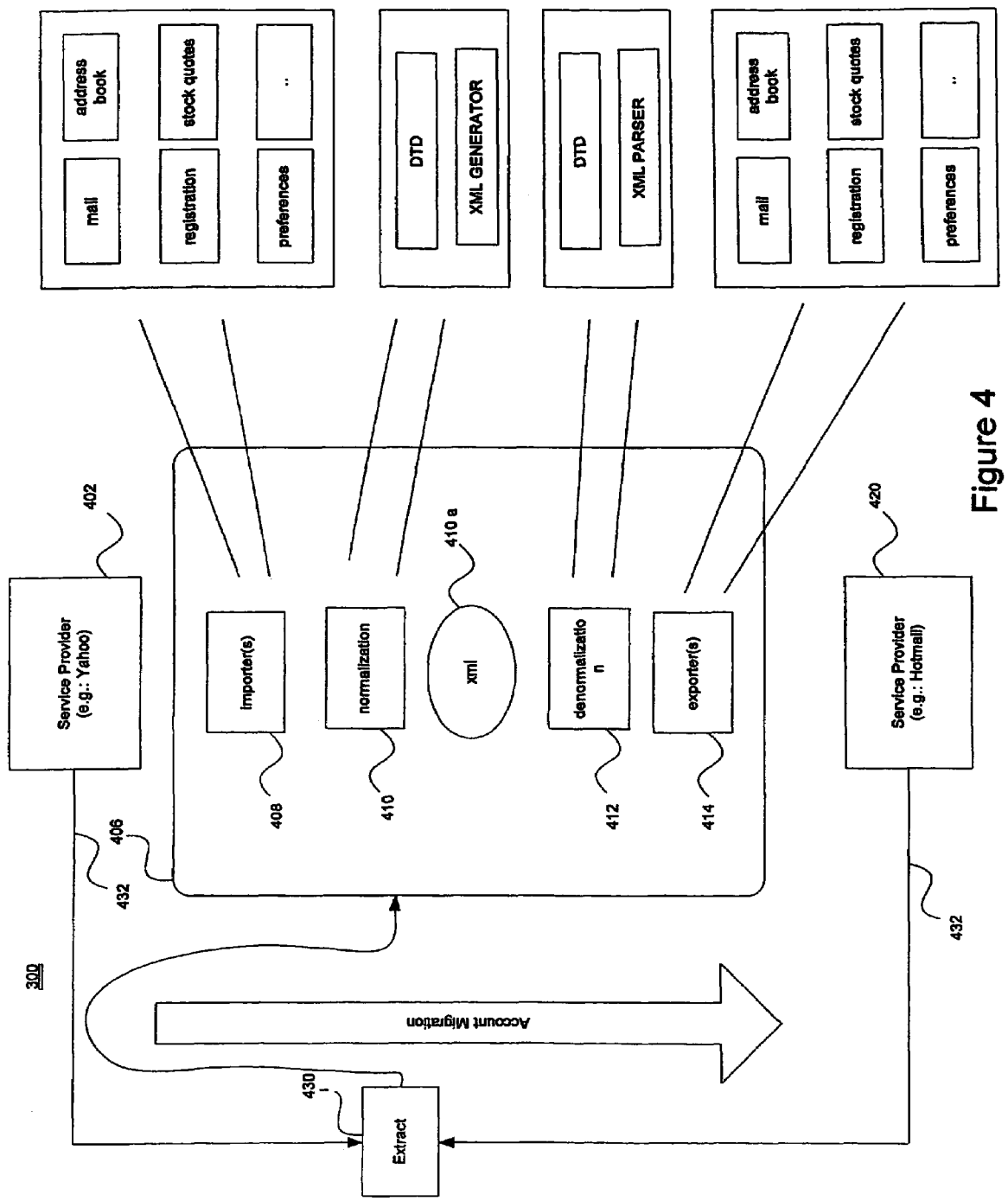
FIG. 4 is a block diagram illustrating the hardware and software of a method for migrating services.

FIG. 4 is a block diagram illustrating the hardware and software 300 of a method for migrating services in operation. This illustration shows a migrator 406 for use with the method of migration. In the exemplary embodiment discussed with respect to FIG. 4, the hardware and software 300 is discussed with respect to wireless telephone service providers, although those skilled in the art will understand that the hardware, software, and methods discussed in FIG. 4 are applicable to any service provision type, as discussed hereinabove and hereinbelow, such as, but not limited to, internet portals, emails, personal web pages, email preferences, calendars and appointments, on-line trading, such as stocks and auctions, financial services, and bill paying.

FIG. 4 illustrates a migrate-from wireless web site 402, as a migrate from service provider 402. The migrator 406 includes an importer 408, a normalizer 410, a normalized database 410a, such as an xml database, a denormalizer, and an exporter 414 to the migrate-to service provider 420. The migrator 406 may additionally include an extractor that scrapes organizational information protocol from at least two service providers, as discussed hereinabove with respect to FIGS. 1, 2, and 3, as part of importer 408.

The importer 408 is in communicative connection with at least one migrate-from service provider 402, which at least one migrate-from service provider 402 has been selected by a user. The importer 408 uses control messages 102, as discussed with respect to FIG. 2, to receive personal data information from the migrate-from service provider 402. After entry to the migrate-from service provider 402 based on, for example, a username and password provided at the migration selection interface by the user, the importer 408 may receive, for example, wireless calling plan, telephone type, calling history, and web-phone setup, such as email, stock quotes, or other preferences, and the information within the email, calendar, etc. Certain items of information, such as salary, for example, may be received as ranges from the migrate-from service provider 402. The importer 408 used for each service provider is unique to that service provider, and imports according to the organizational information protocol of the migrate-from service provider. In a preferred embodiment, the importer 408 is software resident on, for example, a networked server or client PC.

The normalizer 410 receives the first plurality of information from the importer 408, and normalizes the information to a standard format, such as xml, as defined by the DTD. The normalizer 410 preferably generates a standard format, such as the xml 410a, via an xml generator 410a. For example, the user's calling plan, salary range, address, stock quotes, and email are preferably received from the migrate-from wireless provider site 402, and are converted to a standard format. This may include the standardization of certain information received. For example, if the salary range on the migrate-from site 402 is $55,000 to $75,000, this may be normalized into $75,000, as well as normalized into xml language. In a preferred embodiment, the normalizer 410 is software resident on, for example, a networked server or client PC. Alternatively, normalization may be performed by a normalization processor 410.

The denormalizer 412 takes the normalized information from the standardized, such as xml, database 410a, and converts it to the proper format for the migrate-to service provider 420. This proper format for the migrate-to provider 420 is then a second plurality of information. For example, the $75,000 in the above example may need to be converted to a second range for the migrate-to service provider 420, such as $60,000-$80,000. This conversion is performed in the denormalizer 412. The denormalizer 412 parses the normalized information according to the DTD used to normalize the information, and thereby denormalizes the information. In a preferred embodiment, the denormalizer 412 is software resident on, for example, a networked server or client PC. Alternatively, denormalization may be performed by a denormalization processor 412.

The exporter 414 uses control messages, as discussed with respect to FIGS. 2 and 3, to write personal data information to the migrate-to service provider 420. After entry to the migrate-to service provider 420, a username and password provided at the migration selection interface by the user are preferably entered to open the new user account, if required by the migrate-to service provider 420. The exporter 414 may write, for example, wireless calling plan, telephone type, calling history, and web-phone setup, such as email, stock quotes, or other preferences, to the migrate-to service provider 420, and may additionally select certain information at the migrate-to site 420 based on the information from the migrate-from site 402. For example, on the migrate-from wireless site, a first calling plan may be used. At the migrate-to site, the first calling plan may not be available, but, based on the normalized calling history from the migrate-from site, the exporter may be able to select the best calling plan at the migrate-to site for the user. The exporter 414 used for each service provider is unique to that service provider, and exports according to the organizational information protocol of the migrate-to service provider 420. In a preferred embodiment, the exporter 414 is software resident on, for example, a networked server or client PC. In an embodiment wherein xml, or any other normalized format, can be delivered directly to the migrate-to site 420, the exporter 414 may export the personal data information without use of the denormalizer 412.

The extractor 430 extracts an organizational information protocol from at least two service providers. The extractor 430 may be screen or code scraping software, data or language parsing software, or spidering software. Upon extraction of an organizational information protocol from the migrate-from provider 402, the first plurality of information is normalized by the normalizer 410 in accordance with the organizational information protocol 432 correspondent to the migrate-from service provider 402. Upon extraction of an organizational information protocol 432 from the migrate-to provider 402, the second plurality of information is created by denormalization by the denormalizer 412 in accordance with the organizational information protocol 434 correspondent to the migrate-to service provider 420.

It is well know that computer readable storage media include both transitory and non-transitory types of media, with the distinction there between, well within the realm of one of ordinary skill to ascertain as to its normal and ordinary meaning.

Those of ordinary skill in the art will recognize that many modifications and variations of the present invention may be implemented. The foregoing description and the following claims are intended to cover all such modifications and variations.

What is claimed is:

1. A migrator for migrating personalized services embodied in a non-transitory computer-readable storage medium executable by a computer, comprising:
   a database comprising at least one organizational information protocol corresponding to at least one provider of services;
   an importer in communicative connection with at least one migrate-from provider of services, which said at least one migrate-from provider of services has been selected by a user;
   a normalizer that receives a first plurality of information from said importer according to said at least one organizational information protocol corresponding to said at least one migrate-from provider of services and converts said first plurality of information to a standard format;
   a denormalizer that receives said standard format from said normalizer and converts said standard format to a second plurality of information according to said at least one organizational information protocol correspondent to a migrate-to provider of services; and
   an exporter communicatively connected to said migrate-to provider of services, which said exporter receives said second plurality of information from said denormalizer and sends said second plurality to said migrate-to provider of services.

2. The migrator claim 1, further comprising an extractor that extracts an organizational information protocol from at least two providers of services, wherein the first plurality is normalized in accordance with the organizational information protocol correspondent to the migrate-from provider of services, and wherein the second plurality is denormalized in accordance with the organizational information protocol correspondent to the migrate-to provider of services.

3. The migrator claim 1, wherein said importer uses control messages to import the first plurality of information from the migrate-from provider of services.

4. The migrator of claim 1, wherein said importer is unique to each provider of services, and imports according to an organizational information protocol of the migrate-from provider of services.

5. The migrator claim 1, wherein the standard format is xml.

6. The migrator of claim 5, wherein said normalizer includes an xml generator that generates the xml.

7. The migrator of claim 1, wherein said denormalizer parses the standard format according to a DTD used to normalize the standard format, and thereby denormalizes the information.

8. A method for migrating personalized services, said personalized services embodied in a non-transitory computer-readable storage medium executable by a computer, including the steps of:
   extracting organizational information from at least one provider of services to form at least one organizational information protocol;
   selecting a first provider of services from said at least one provider of services, said first provider of services having a first corresponding organizational information protocol;
   accessing said first provider of services;
   receiving, according to the organizational information protocol correspondent to said first provider of services, a first plurality of information from said first provider of services, upon said accessing said first provider of services;
   accessing a second provider of services from said at least one provider of services, said second provider of services having a second corresponding organizational information protocol; and
   writing said first plurality of information to said second provider of services according to the second organizational information protocol correspondent to said second provider of services.

9. The method of claim 8, wherein said first plurality of information comprising a contact list, personalized data, and preferences.

10. The method of claim 8, wherein said at least one provider of services comprises banking and financial services, email services, on line calendar and address book services, mysite.com pages, bill payment services, application service providers, ISP services, wireless customization services, shopping services, online trading services, and online auction services.

11. The method of claim 10, wherein the banking and financial services further comprise payment of a mortgage, a loan, a balance transfer, account balances, filling out of forms, credit checks, digital signal encryption, electronic transfer formatting and location, and login and password information.

12. The method of claim 8 wherein said at least one provider of services further comprises career services, professional services, and social services.

13. The method of claim 12 wherein the career services further comprise employee, salary, payroll and job title information.

14. The method of claim 8 wherein said at least one provider of services is a wireless service provider.

15. The method of claim 14 wherein said first plurality of information comprises a wireless calling plan, telephone type, calling history, web-phone setup and web-phone preferences.

16. The method of claim 8, wherein the step of extracting organizational information from the at least one provider of services to form at least one organizational information protocol further comprises using the login and password information of at least one user.

17. The method of claim 8, wherein the step of extracting organizational information from the at least one provider of services to form at least one organizational information protocol further comprises placing said organizational information protocol into a database.

18. The method of claim 8, wherein the step of extracting organizational information from the at least one provider of services to form at least one organizational information protocol further comprises spidering the at least one provider of services.

19. The method of claim 8, wherein the step of extracting organizational information from the at least one provider of services to form at least one organizational information protocol further comprises scraping the at least one provider of services.

20. The method of claim 8, wherein the step of extracting organizational information from the at least one provider of services to form at least one organizational information protocol further comprises:
   entering the at least one provider of services as a browser;
   parsing the at least one provider of services;
   mapping the organizational information protocol to a standard format.

21. The method of claim 8, wherein the at least one provider of services provides said organizational information protocol to the extracting party.

22. The method of claim 8, wherein said organizational information protocol further comprises the manner of organization, information entry methods, and information extraction methods of the at least one service provider.

23. The method of claim 8, wherein the at least one service provider performs the migration.

24. The method of claim 8, wherein the at least one service provider provides a link for a customer to access a migration provider.

* * * * *